March 23, 1937.   H. L. SPAUNBURG   2,074,625
LOCK DEVICE
Filed Feb. 26, 1934
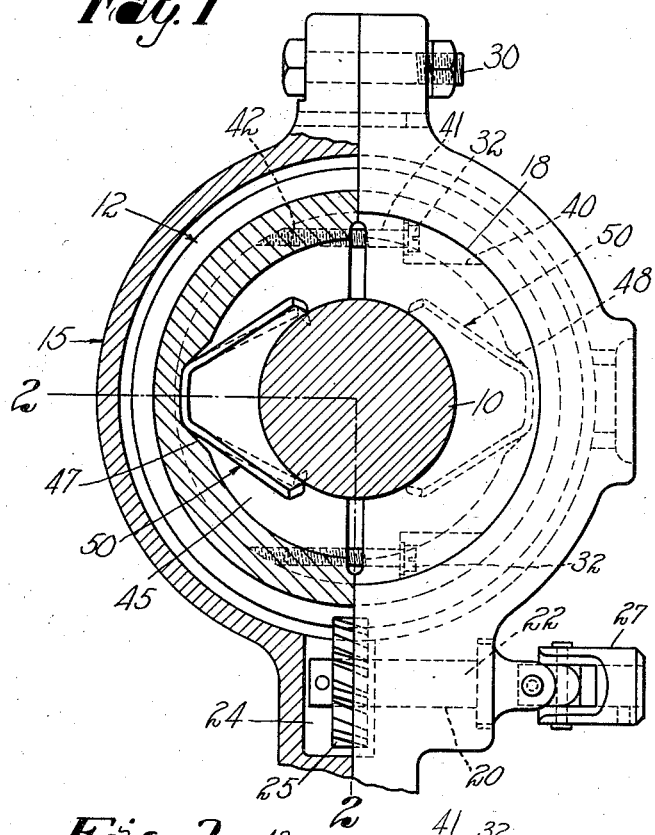
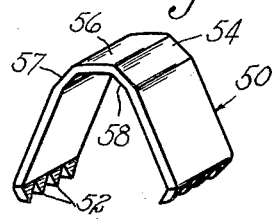
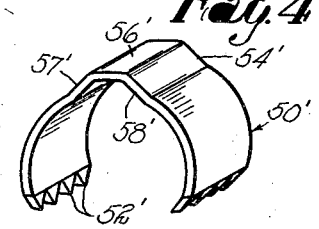
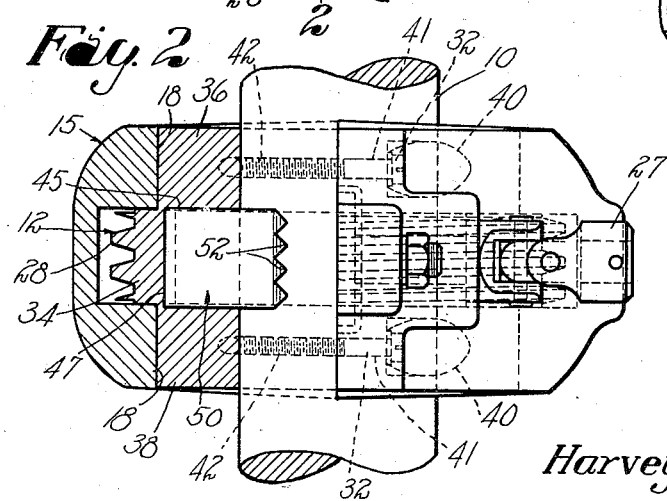
Inventor
Harvey L. Spaunburg
By N. Clay Lindsey.
Attorney Patented Mar. 23, 1937

2,074,625

UNITED STATES PATENT OFFICE 2,074,625

LOCK DEVICE

Harvey L. Spaunburg, Bristol, Conn., assignor to Veeder-Root, Incorporated, Hartford, Conn., a corporation of Connecticut Application February 26, 1934, Serial No. 712,880

2 Claims. (Cl. 287—52.05)

This invention relates to improvements in machine elements, and more specifically to a lock device for securing a power transferring member against rotation upon a power shaft, and has for one of its objects the provision of a device of the character described by means of which the power transferring member or gear may be placed upon the shaft and secured against movement relative to the shaft without the necessity of drilling, grooving, or threading the shaft.

A further object resides in the provision of a device of the character described which is light in weight, simple and economical to manufacture, and which, at the same time, will permanently and positively restrain the power transferring, or gear member, against movement relative to the power shaft.

Other objects and advantages will appear as the description proceeds.

In the accompanying drawing, in which like reference numerals refer to similar parts throughout, I have illustrated a suitable mechanical embodiment of the idea of my invention and one slightly modified form thereof. The drawing, however, is for the purpose of illustration only, and is not to be taken as limiting the invention the scope of which is to be measured entirely by the scope of the appended claims.

In the drawing,

Fig. 1 is a partly sectional view of a shaft, a gear, and a gear casing showing the device of the invention as applied to restrain the gear against rotation relative to the shaft;

Fig. 2 is a sectional view on the line 2—2 of Fig. 1;

Fig. 3 is a perspective view of the preferred form of my improved device; and

Fig. 4 is a perspective view of a somewhat modified form of the device illustrated in Fig. 3.

Referring to the drawing in detail, the numeral 10 indicates a power shaft, such as the crank shaft of a loom. The numeral 12 indicates a worm, or screw gear, mounted upon the crank shaft 10. This worm 12 is surrounded by a gear casing 15 which bears, at either side thereof, upon axial extensions formed on the worm, as indicated at 18 in Fig. 2. In one portion thereof, the gear casing 15 is provided with a bearing aperture 20 within which is journaled a shaft 22. This bearing aperture 20 terminates in a recess 24 within which is mounted a worm gear 25 operatively associated with the worm 12 so that the gear 25 will be caused to rotate upon rotation of the worm 12. The gear 25 is secured against rotation upon the end of the shaft 22, the opposite end of the shaft 22 being operatively secured to some mechanism, not shown, such as a tachometer, counter, or pick counter, by means of a universal joint 27 and other connecting elements, not illustrated. In this illustration, the gear 25 is of materially smaller diameter than the worm 12, and the threads 28 of the worm have a very slight pitch angle in order to introduce a gear reduction between the worm 12 and the gear 25. The casing 15 is preferably made in two separate parts, secured together by a suitable means, such as the bolt 30, and may be secured to the fixed part of the machine which supports the shaft 10. The worm 12 is also divided along a diameter thereof to form two separate parts adapted to be secured together by a suitable means, such as the screws 32. The worm, generally indicated at 12, is provided with a centrally located, radially extending, portion 34 upon the periphery of which are formed the screw threads 28. Upon each side of this central portion, the worm is provided with an axially extending portion, as indicated at 36 and 38, of less diameter than the central portion 34 and bearing upon the shaft 10. One of the parts of the worm is provided, in each of these axial extensions 36 and 38, with notches, as indicated at 40, and with apertures 41 extending from the notches to the surface dividing the two parts of the worm. The other part of the worm is provided with screw threaded apertures 42 adapted to aline with the apertures 41 when the worm is mounted upon the shaft 10 in assembled relation, the screws 32 extending through the apertures 41 and being screw threaded into the apertures 42 to secure the two parts of the worm together upon the shaft. It will be understood that there are two pairs of screws 32 and associated notches and apertures, one pair being located upon each side of the shaft 10 in position to extend through the plane dividing the two parts of the worm to connect the two parts of the worm together. The worm 12 is hollowed out within the central portion 34 thereof to provide an annular recess 45 surrounding a portion of the shaft 10 within the two parts of the worm. In the circumferential wall of this recess 45, in each of the separable parts of the worm 12, I preferably provide a depression, as indicated at 47 and 48 in Fig. 1.

In order to secure the worm 12 against movement relative to the shaft 10, I have provided a locking device in the form of a substantially U-shaped spring member, generally indicated at 50 in Fig. 3, or 50' in Fig. 4. The ends of this U-shaped member are serrated to provide sharpened teeth 52, and the ends are separated by a distance materially less than the diameter of the shaft 10, as is clearly illustrated in Fig. 1. The intermediate portion of this U-shaped spring member is formed as an abutment 54 adapted to fit closely within the depressions 47 and 48. This abutment member is preferably formed by bending the intermediate portion of the spring lock member in three planes, as indicated at 56, 57, and 58, to provide a construction in the form of one-half of a cylindrical hexagon. As is also clearly illustrated in Fig. 1, the distance from the intermediate plane 56 of the lock member to the plane, including both ends thereof, is somewhat greater than the distance from the bottom of the depression 47 or 48 to that chord of the circular cross section of the shaft 12 which passes through the points on the circumference of the shaft first contacted by the ends of the lock device so that, when the two parts of the worm are secured together in operative relation, the lock members are placed under compression between the worm and the shaft, as illustrated by the full lines and dotted lines at the left-hand side of Fig. 1. This compression upon the member 50 causes the teeth 52 to bite into the shaft 10 when the worm 12 tends to rotate relative to the shaft, whereby the spring member 50 provides a positive and permanent lock between the worm and the shaft to restrain the worm against rotation relative to the shaft.

In order to properly balance the weight of the worm 12 and provide additional surety against rotation of the worm relative to the shaft, I provide a lock member 50 between each half of the worm 12 and the shaft 10, as clearly illustrated in Fig. 1. The modified form of the device illustrated in Fig. 4 has an intermediate abutment portion 54' bent along the planes 56', 57', and 58' in the form of one-half of a cylindrical hexagon, as in the case of the form illustrated in Fig. 3, and has the ends thereof serrated to provide sharpened teeth 52'. In the modified form, however, those portions of the lock member between the sets of teeth 52' and the intermediate abutment portion 54' are curved along a circular arc in order to provide a somewhat different set to the teeth 52' and to provide a slight resiliency in the member to cushion the connection between the worm 12 and the shaft 10 against minor shocks.

As clearly illustrated in Fig. 3, the portions of the preferred lock member 50 between the teeth 52 and the abutment portion 54 are straight and rigid.

From the illustration and the above description, it will be observed that I have provided a lock device for securing a power transferring member, such as a gear or worm, against rotation relative to a power shaft which renders the mounting of the gear or worm upon the shaft in proper relation thereto extremely simple and easy, which is economical to install by reason of the fact that it obviates the necessity of drilling, grooving, or threading the power shaft.

It will also be observed that I have provided an improved lock device which is positive in action and durable in use.

While I have illustrated and described a specific mechanical embodiment of the idea of my invention and a slightly modified form thereof, it is to be understood that the invention is not limited to the specific construction so illustrated and described but that such changes in the size, shape, and arrangement of parts may be resorted to as come within the scope of the appended claims.

Having now described my invention so that others skilled in the art may clearly understand the same, what I desire to secure by Letters Patent is as follows:

1. In combination, a power shaft, a power transferring member adapted to be mounted on said shaft and having an internal recess, a lock member interposed between said shaft and power transferring member and comprising a relatively stiff U-shaped member having an intermediate connecting portion fitting in and directly abutting against the bottom wall of said recess to prevent said connecting portion from moving relative to the power transferring member, a pair of arms respectively extending outwardly from the opposite outer ends of said intermediate connecting portion, the free ends of said arms having teeth adapted to engage and bite into the surface of said shaft, said teeth serving as the sole supporting means for the outer ends of the arms which are substantially free and unsupported between their ends at all times the arms having sufficient rigidity so that they will not appreciably flex under the longitudinal thrusts exerted thereon when the shaft is driven.

2. In combination with a power shaft and a two-part power transferring member adapted to be mounted on said shaft, a lock member between said power shaft and power transferring member for preventing relative rotation therebetween and comprising a relatively stiff strip of metal provided with an intermediate connecting portion, directly abutting and rigidly bearing against said power transferring member and an arm at each end of said connecting portion disposed at an angle thereto, said arms having at their free ends teeth adapted to bite into said shaft and serving as the sole support for the outer ends of the arms, said arms being unsupported intermediate of their ends and being sufficiently rigid that they will not appreciably flex under longitudinal thrusts exerted thereon when the shaft is driven, and means for preventing said connecting portion from moving relative to said power transferring member when the shaft is driven.

HARVEY L. SPAUNBURG.